US012706257B2

(12) United States Patent
Askan

(10) Patent No.: US 12,706,257 B2

(45) Date of Patent: Aug. 11, 2026

(54) ELECTRICAL SWITCHING ARRANGEMENT

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 237 days.

(21) Appl. No.: 18/691,699

(22) PCT Filed: Sep. 19, 2022

(86) PCT No.: PCT/EP2022/025435

§ 371 (c)(1),
(2) Date: Mar. 14, 2024

(87) PCT Pub. No.: WO2023/041200

PCT Pub. Date: Mar. 23, 2023

(65) Prior Publication Data

US 2024/0363292 A1 Oct. 31, 2024

(30) Foreign Application Priority Data

Sep. 20, 2021 (GB) ..................................... 2113405

(51) Int. Cl.
*H01H 9/54* (2006.01)
*H01H 33/59* (2006.01)

(52) U.S. Cl.
CPC .......... *H01H 9/542* (2013.01); *H01H 33/596* (2013.01); *H01H 2009/544* (2013.01)

(58) Field of Classification Search
CPC ................. H01H 9/542; H01H 33/596; H01H 2009/544; H01H 33/166; H01H 9/10;
(Continued)

(56) References Cited

U.S. PATENT DOCUMENTS

2012/0218676 A1* 8/2012 Demetriades .......... H01H 9/542 361/115
2013/0106184 A1 5/2013 Haefner et al.
(Continued)

FOREIGN PATENT DOCUMENTS

WO WO 2021008993 A1 1/2021
WO 2021/163795 A1 8/2021

OTHER PUBLICATIONS

K. K. M. Siu, C. N. M. Ho and D. Li, "Design and Analysis of a Bidirectional Hybrid DC Circuit Breaker Using AC Relays With Long Life Time," in IEEE Transactions on Power Electronics, vol. 36, No. 3, pp. 2889-2900, Mar. 2021, doi: 10.1109/TPEL.2020.3013612 (Year: 2021).*

*Primary Examiner* — Sreeya Sreevatsa
(74) *Attorney, Agent, or Firm* — LEYDIG, VOIT & MAYER, LTD.

(57) ABSTRACT

An electrical switching arrangement comprising a first conductor path and a second conductor path, whereby the second conductor path is connected in parallel to the first conductor path, a first switch which is arranged in the first conductor path, a second switch which is arranged in the second conductor path, it is suggested, that at least a first semiconductor device is arranged in the second conductor path, and that the first semiconductor device is located in series to the second switch.

11 Claims, 3 Drawing Sheets

(58) Field of Classification Search
CPC ........ H01H 9/106; H01H 9/548; H01H 9/541; H01H 33/59; H02H 3/08; H02H 3/087
USPC ............................................................ 361/13
See application file for complete search history.

(56) References Cited

U.S. PATENT DOCUMENTS

| | | | | |
|---|---|---|---|---|
| 2013/0199912 | A1* | 8/2013 | Azzola | H01H 9/542 200/5 R |
| 2020/0106258 | A1* | 4/2020 | Mehraeen | H02H 1/063 |
| 2020/0366079 | A1* | 11/2020 | Telefus | H02H 3/08 |
| 2021/0074499 | A1 | 3/2021 | Engewald | |

* cited by examiner

ELECTRICAL SWITCHING ARRANGEMENT

CROSS REFERENCE TO RELATED APPLICATIONS

This application is a U.S. National Phase application under 35 U.S.C. § 371 of International Application No. PCT/EP2022/025435 filed on Sep. 19, 2022, and claims benefit to British Patent Application No. GB2113405.1, filed on Sep. 20, 2021. The International Application was published in English on Mar. 23, 2023, as WO 2023/041200 A1 under PCT Article 21(2).

FIELD

The present disclosure relates to an electrical switching arrangement.

BACKGROUND

In power electronics hybrid circuit breakers or solid-state circuit breakers usually comprise at least one isolating relay for each connection part which is arranged in series to the hybrid switching circuits respectively the solid-state switching circuits. These isolating relays open their contacts usually almost in zero current condition due to the fact that the current breaking and interruption of the current is conducted by power electronics switching, therefore the hybrid switching circuits respectively the solid-state switching circuits. These parts of a hybrid circuit breaker or a solid-state circuit breaker are not able to switch their contacts under current. Such isolation relays are neither designed nor sized for such openings.

It is possible that the power switch fails and that the isolating relay has to switch off the electric line during high currents. This switch-off process would be a problem for the isolating relay. Especially the switch-off process of a highly inductive connected load would be complicated, even in an AC-network. Switching off a network under higher DC-current would be almost impossible without destroying the isolating relay, as the relay would melt during arcing and would cause a fire in the area. Switching off such currents with conventional relays would require very big and non-compact relays with high power driver circuits. Such a relay requires a lot of space and it is expensive.

SUMMARY

In an embodiment, the present disclosure provides a hybrid circuit breaker comprising a hybrid switching device and an electrical switching arrangement arranged in series, the hybrid switching device comprising a mechanical switch and a transistor arrangement switched parallel to the mechanical switch, and the electrical switching arrangement comprising: a first conductor path and a second conductor path, whereby the second conductor path is connected in parallel to the first conductor path, a first switch which is arranged in the first conductor path, a second switch which is arranged in the second conductor path, wherein at least a first semiconductor device is arranged in the second conductor path, and that the first semiconductor device is located in series to the second switch.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
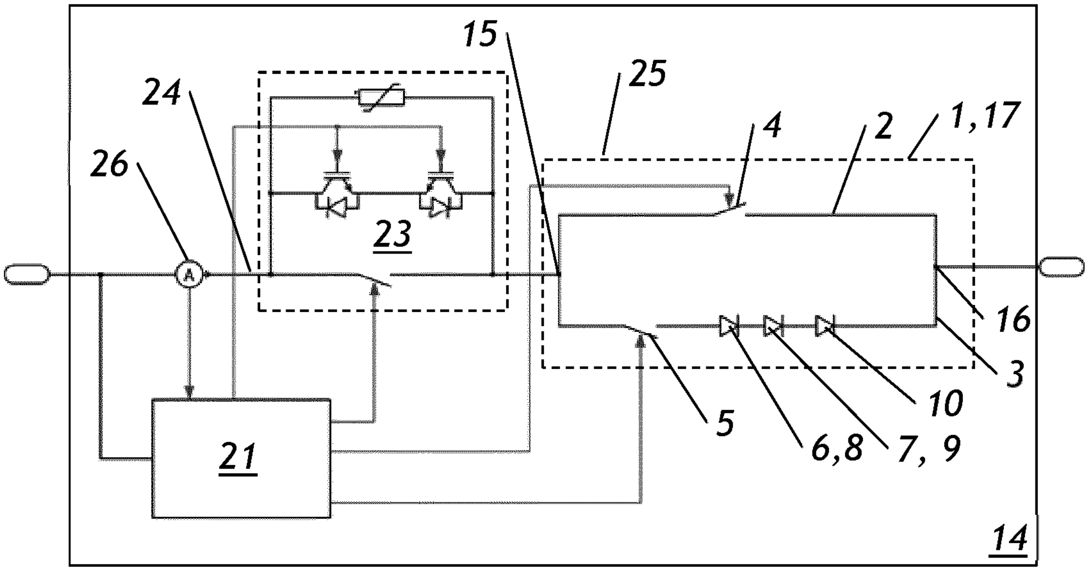
FIG. 1 illustrates a hybrid circuit breaker with a first preferred embodiment of an electrical switching arrangement.

In accordance with an embodiment, the present disclosure provides an electrical switching arrangement to open contacts under high currents, especially high DC-currents, and which is less bulky and compact. WO 2021/163795 A1 and US 2021/0074499 A1 relate to hybrid switching devices.

As a result, it is possible to switch off an electrical supply line under higher currents in the electrical supply line by an electrical switching arrangement respectively an isolating relay. This electrical switching arrangement or isolating relay is not a circuit breaker. It is also possible to switch off electrical supply lines with connected inductances and/or capacitances, which store electrical energy and which could cause a problem during the switch-off because of higher currents caused by the switch-off process. The electrical switching arrangement is also able to switch off higher DC-currents, without problems caused by DC-arcs. The electrical switching arrangement is less bulky and compact, and has a long life cycle.

In accordance with another embodiment, the present disclosure provides a method for operating an electrical switching arrangement.

The disclosure is described with reference to the drawings. The drawings show only exemplary embodiments of the disclosure.

FIGS. 1 to 5 illustrate preferred embodiments of an electrical switching arrangement 1 comprising a first conductor path 2 and a second conductor path 3, whereby the second conductor path 3 is connected in parallel to the first conductor path 2, a first switch 4 which is arranged in the first conductor path 2, a second switch 5 which is arranged in the second conductor path 3, whereby at least a first semiconductor device 6 is arranged in the second conductor path 3, and whereby the first semiconductor device 6 is located in series to the second switch 5.

As a result, it is possible to switch off an electrical supply line under higher currents in the electrical supply line by an electrical switching arrangement respectively an isolating relay. This electrical switching arrangement or isolating relay is not a circuit breaker. It is also possible to switch off electrical supply lines with connected high inductances and/or high capacitances, which store electrical energy and which could cause a problem during the switch-off because of currents caused by the switch-off process. The electrical switching arrangement is also able to switch off higher DC-currents, without problems caused by DC-arcs. The electrical switching arrangement is less bulky and compact, and has a long life cycle.

The electrical switching arrangement 1 comprises at least a first conductor path 2, respectively a first electric line, and at least a second conductor path 3, respectively a second electric line. The first conductor path 2 is also known as main current path. The second conductor path 3 is also known as auxiliary current path.

A first switch 4 is arranged in the first conductor path 2. The first switch comprises mechanical contact elements and is typically a relay. A second switch 5 is arranged in the second conductor path 3. The second switch comprises mechanical contact elements and is typically a relay. Preferably, the first switch 4 and/or the second switch 5 comprise auxiliary contacts to monitor the state of the main contacts: open or closed.

The second conductor path 3 is connected in parallel to the first conductor path 2. The first switch 4 is connected in parallel to the second switch 5.

The first switch 4 and the second switch 5 are connected to an input part of the electrical switching arrangement 1. In the preferred embodiment the electrical switching arrangement 1 is part of a hybrid circuit breaker 14 or a solid-state circuit breaker.

The hybrid circuit breaker 14 or HCB comprises a hybrid switching device 23 with a mechanical switch and a transistor arrangement switched parallel to the mechanical switch. The mechanical switch is arranged in the one line conductor path 24. Hybrid circuit breakers 14 further comprise a first mechanical separator 25 in the one line conductor path 24 for galvanic separation, which are not able to switch off a current. Another term for the first mechanical separator 25 would be galvanic separation relay. Preferably, the first mechanical separator 25 of the hybrid circuit breaker 14 is embodied as electrical switching arrangement 1.

The FIGS. 1 to 5 show hybrid circuit breakers 14. The circuit breaker could also be embodied as solid-state circuit breaker or SSCB. A SSCB also comprises a first mechanical separator 25 in the one line conductor path 24 for galvanic separation. Preferably, the first mechanical separator 25 of the solid-state circuit breaker is embodied as electrical switching arrangement 1.

A hybrid circuit breaker 14 and a solid-state circuit breaker comprise an electric control unit 21, which is typically embodied as μC or μP. According to the preferred embodiments, the first switch 4 and the second switch 5 are controlled by the electric control unit 21 of the hybrid circuit breaker 14 or the solid-state circuit breaker, and connected to the electric control unit 21.

The electrical switching arrangement 1 could be embodied as a combination of individual electric devices of each of the described parts, which single devices are connected together to build the electrical switching arrangement 1. As described, the electrical switching arrangement 1 is preferably part of a hybrid circuit breaker 14 or a solid-state circuit breaker. A further preferred embodiment of the electrical switching arrangement 1 is a single electrical switching device 17. In this embodiment, the electrical switching device 17 is a single device and comprises all parts of the electrical switching arrangement 1. Preferably, the parallel connection of the first and the second conductor paths 2, 3 is arranged in the housing, and the housing only comprises a first electrical connecting part 15 and a second electrical connecting part 16 to connect the electrical switching arrangement 1 with a network. The parallel connection of the first and the second conductor paths 2, 3 is arranged inside the housing, as shown in FIGS. 1 to 5. The second conductor path 3 is an auxiliary path that only conducts when hybrid switching by the hybrid switching device 23 fails to stop current and when voltage drop on the contact of the first switch 4 is greater than the turn-on voltage of second semiconductor devices in the second semiconductor path 3.

The electrical switching arrangement 1 is preferably a low-voltage electrical switching arrangement 1. Low voltage DC usually means up to 1500 volts DC voltage.

At least a first semiconductor device 6 or semiconductor component is arranged in the second conductor path 3. The first semiconductor device 6 is located or placed or arranged in series to the second switch 5. A semiconductor device 6 or component comprises at least one semiconductor. However, it can comprise further parts which are used to operate the semiconductor parts. The at least one semiconductor device 6 reduces the current and damps especially higher getting currents. It makes it possible to switch off the first switch 4 and the current is passing through the second conductor path 3, and the semiconductor device 6, which increases the resistance and reduces the current.

In normal operation, respectively in switched on state, both switches 4, 5, that means the first switch 4 and the second switch 5, are in switched-on-positions. Because the voltage drop on the first conductor path 2 is much lower than the turn-on voltage of a diode in the second conductor path 3, no current is flowing in the second conductor path 3, as long as the first switch 4 is closed. Further,—for a switch-off proceeding—the first switch 4 is switched-off, and a predefined time after switching-off the first switch 4, the second switch 5 is switched-off.

Preferably, at least a second semiconductor device 7 is arranged in the second conductor path 3. The second semiconductor device 7 is located in series to the second switch 5 and to the first semiconductor device 6. FIGS. 1, 2, 3 and 4 are showing embodiments with more than one semiconductor device. These further semiconductor devices increase the total turn-on voltage for diodes 8, 9, 10 and increase the blocking voltage.

Figure 2:
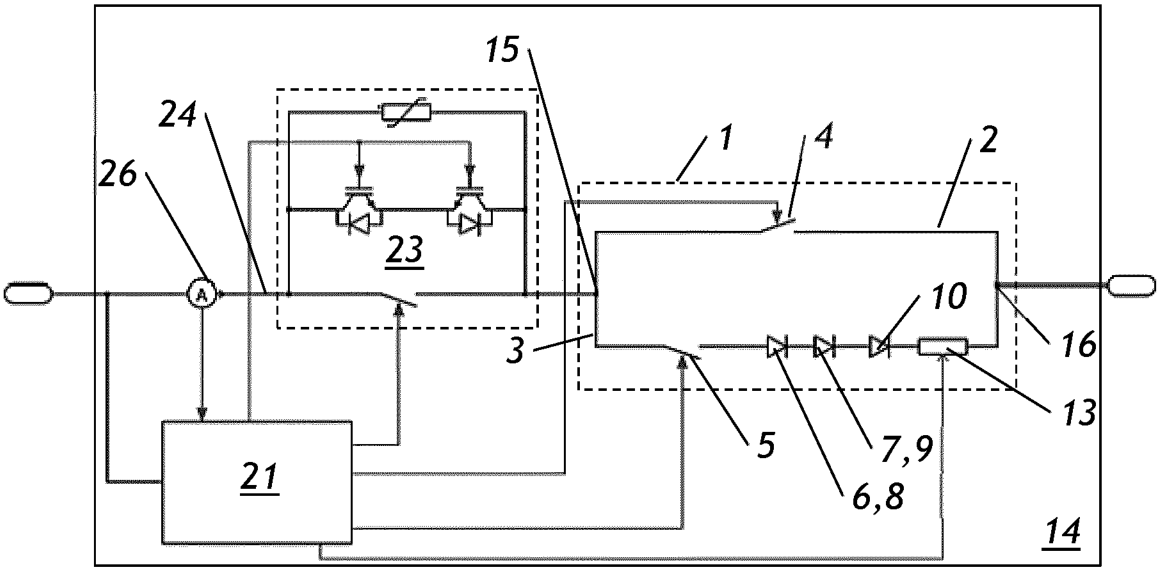
FIG. 2 illustrates a hybrid circuit breaker with a second preferred embodiment of an electrical switching arrangement.

According to the first and second preferred embodiment, the first semiconductor device 6 is embodied as a first diode 8. FIGS. 1 and 2 show such embodied electrical switching arrangements 1. The second semiconductor device 7 is embodied as a second diode 9, and the second diode 9 is located or placed in the same forward direction as the first diode 8. Preferably, and as shown in FIGS. 1 and 2, a third diode 10 is further arranged in the second conductor path 3. Additional diodes would make sure that at least one of the diodes would react to the current.

Diodes are passive elements and do not require an operation. In case the first switch 4 opens the first conductor path 2 under current, the current will be commuted to the second conductor path 3 when the arcing voltage happens between the main contacts of the first switch 4. The diodes 8, 9, 10 are sized or embodied or selected to a predefined value of a product of current square and time i2*t* to interrupt the current by opening current due to melting semiconductors or bonding wires. The diodes 8, 9, 10 react like a fuse. Once current is stopped or restricted by the diodes 8, 9, 10, the second switch 5 is open to provide isolation. The second conductor path 3 is sized for having i2*t* levels or values larger then i2*t* values of the diodes 8, 9, 10.

Preferably, the electrical switching arrangement 1 can be improved by adding a fuse 13 in series with the diodes 8, 9, 10 to avoid breakdown of at least one of the diodes 8, 9, 10.

The first fuse is a backup for the diodes 8, 9, 10. In this case the first fuse 13 opens the circuit and second conductor path 3 opens under no current. Preferably, the first fuse would comprise auxiliary contacts for showing the state of the fuse: closed or melted.

The first and the second embodiment according FIGS. 1 and 2 are not bidirectional.

Figure 3:
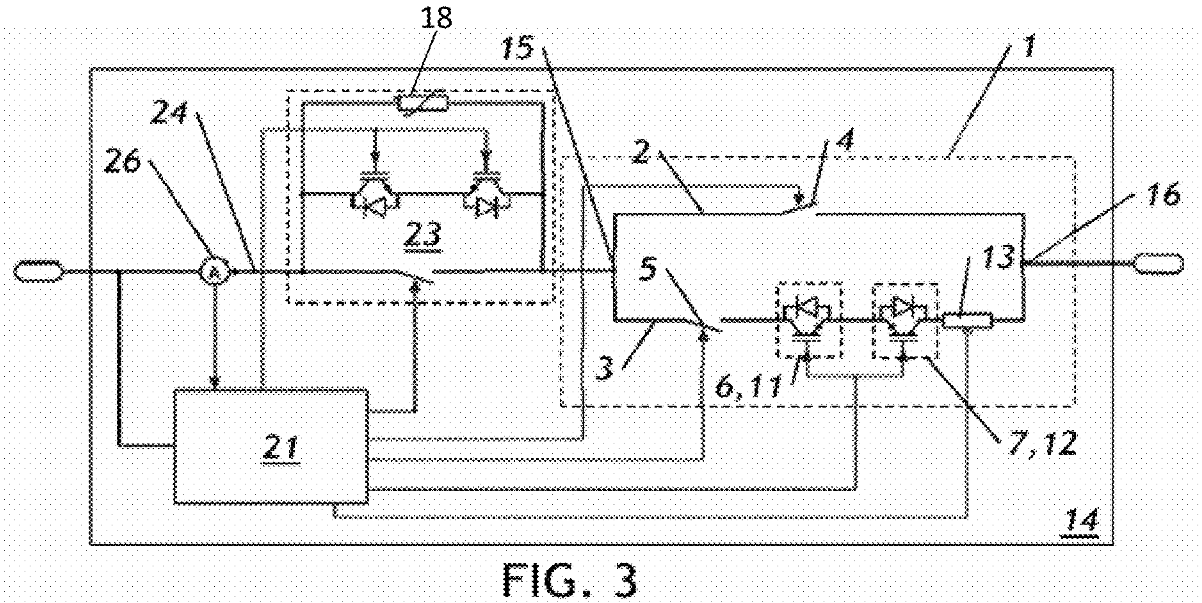
FIG. 3 illustrates a hybrid circuit breaker with a third preferred embodiment of an electrical switching arrangement.
Figure 4:
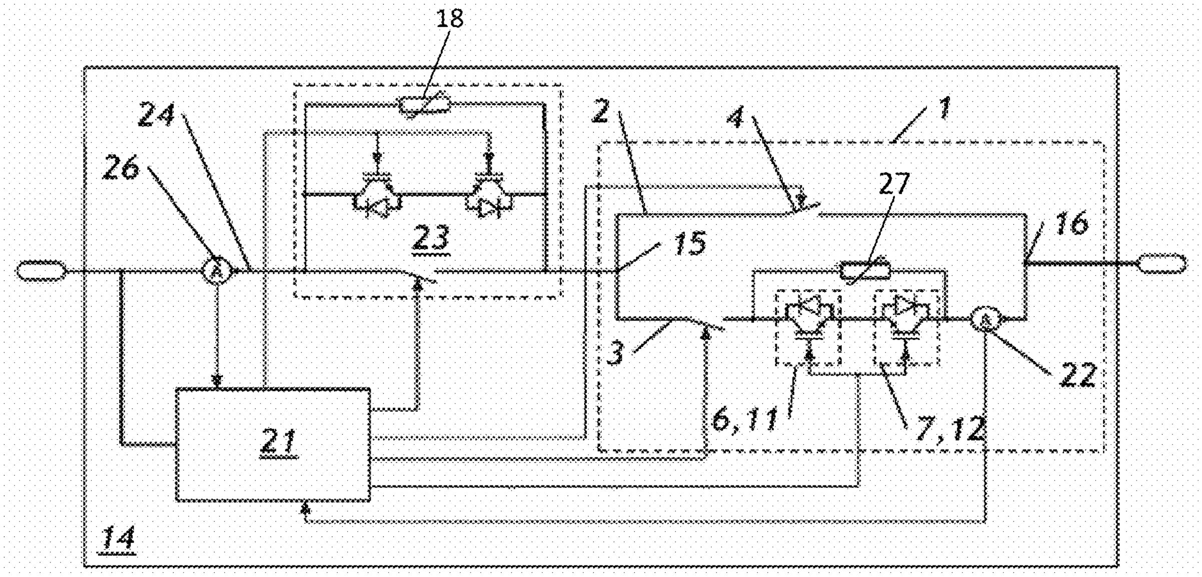
FIG. 4 illustrates a hybrid circuit breaker with a fourth preferred embodiment of an electrical switching arrangement.

According to the third and fourth preferred embodiments, the first semiconductor device 6 is a first transistor arrangement 11. The transistor arrangement comprises at least one transistor, especially an IGBT. Further, the transistor arrangement can comprise additional parts, especially an antiparallel diode. FIGS. 3 and 4 show such transistor arrangements.

Preferably, a second semiconductor device 7 is used, and the second semiconductor device 7 is a second transistor arrangement 12, and the second transistor arrangement 12 is located in another forward direction as the first transistor arrangement 11. This electrical switching arrangement 1 would be bidirectional.

As shown in FIGS. 3 and 4, the third and fourth preferred embodiments further comprise one or more varistors (e.g., a first varistor 18). Varistors or other overvoltage protection devices limit impulse voltages from outside.

The fourth embodiment according to FIG. 4 further comprises another varistor 27 parallel to both transistor devices 11, 12.

The embodiment according to FIG. 3 is constantly driven or in on-state. The preferred embodiment according to FIG. 4 comprises a current measuring device 22 arranged in the second conductor path 3. The current measuring device 22 is connected to the electric control unit 21 and enables to measure whether current is flowing in the second conductor path 3 or not. This current measuring device 22 could help to control the electrical switching arrangement 1, especially if it is part of a hybrid circuit breaker 14 or a solid-state circuit breaker. As shown in FIGS. 1 to 4, the hybrid circuit breaker 14 or a solid-state circuit breaker would further comprise an additional current measuring device 26.

Figure 5:
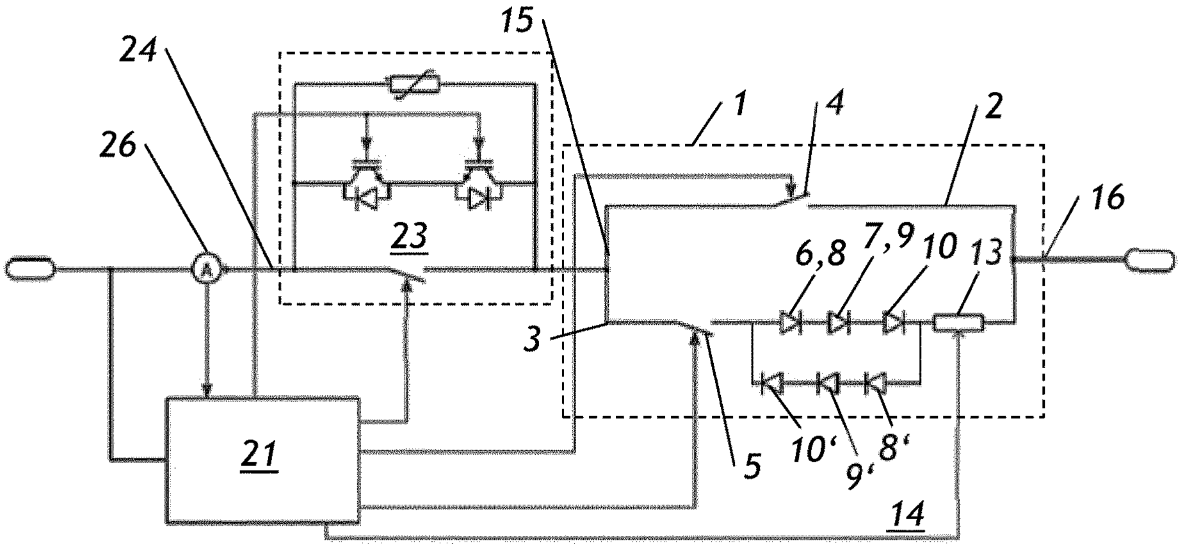
FIG. 5 illustrates a hybrid circuit breaker with a fifth preferred embodiment of an electrical switching arrangement.

According to a fifth embodiment, as shown in FIG. 5, the first semiconductor device 6 is embodied a first diode 8. The second semiconductor device 7 is embodied as a second diode 9, and the second diode 9 is located or placed in the same forward direction as the first diode 8. Preferably, similar to the embodiments shown in FIGS. 1 and 2, a third diode 10 is further arranged in the second conductor path 3. To this first group of diodes that includes at least the first diode 8 and the second diode 9, a second group of diodes is arranged in anti-parallel, i.e., in parallel and in another forward direction. The second group of diodes includes at least a fourth diode 8' and a fifth diode 9', and may preferably include a sixth diode 10', wherein the fifth diode 9' and the sixth diode 10' are located or placed in the same forward direction as the fourth diode 8'. Therefore, electrical switching arrangement 1 would be bidirectional.

Thus, the third, the fourth and the fifth embodiments are bidirectional, or in other words, polarity independent arrangements.

While the present disclosure has been particularly shown and described with reference to exemplary embodiments thereof, it will be understood by those skilled in the art that various changes in form and details may be made therein without departing from the spirit and scope of the present disclosure as defined by the appended claims. The exemplary embodiments should be considered as descriptive only and not for purposes of limitation. Therefore, the scope of the present disclosure is not defined by the detailed description but by the appended claims.

Hereinafter are principles for understanding and interpreting the actual disclosure.

Features are usually introduced with an indefinite article "one, a, an". Unless otherwise stated in the context, therefore, "one, a, an" is not to be understood as a numeral.

The conjunction "or" has to be interpreted as inclusive and not as exclusive, unless the context dictates otherwise. "A or B" also includes "A and B", where "A" and "B" represent random features.

By means of an ordering number word, for example "first", "second" or "third", in particular a feature X or an object Y is distinguished in several embodiments, unless otherwise defined by the disclosure. In particular, a feature X or object Y with an ordering number word in a claim does not mean that an embodiment of the disclosure covered by this claim may have a further feature X or another object Y.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A hybrid circuit breaker comprising a hybrid switching device and an electrical switching arrangement arranged in series, the hybrid switching device comprising a mechanical switch and a transistor arrangement arranged in parallel to the mechanical switch, and the electrical switching arrangement comprising:

a first conductor path and a second conductor path, wherein the second conductor path is connected in parallel to the first conductor path;

a first switch which is arranged in the first conductor path;

a second switch which is arranged in the second conductor path; and at least a first semiconductor device which is arranged in the second conductor path, and wherein the first semiconductor device is arranged in series to the second switch.

2. The hybrid circuit breaker according to claim 1, wherein at least a second semiconductor device is arranged in the second conductor path, and wherein the second semiconductor device is in series with the second switch and the first semiconductor device.

3. The hybrid circuit breaker according to claim 2, wherein, the first semiconductor device is a first diode.

4. The hybrid circuit breaker according to claim 3, wherein the second semiconductor device is a second diode, and the second diode is located in the same forward direction as the first diode.

5. The hybrid circuit breaker according to claim 4, wherein at least a fourth diode and a fifth diode are located in anti-parallel to the series arrangement of the first diode and the second diode, and wherein the fifth diode is in series with the fourth diode.

6. The hybrid circuit breaker according to claim 2, wherein the first semiconductor device is a first transistor arrangement.

7. The hybrid circuit breaker according to claim 6, wherein the second semiconductor device is a second transistor arrangement, and the second transistor arrangement is located in another forward direction as the first transistor arrangement.

8. The hybrid circuit breaker according to claim 1, wherein at least a first fuse is arranged in the second conductor path, and the first fuse is located in series to the second switch.

9. The hybrid circuit breaker comprising at least a first line conductor path, wherein a first mechanical separator is arranged in the first line conductor path, wherein the first mechanical separator is the electrical switching arrangement according to claim 1.

10. A method for operating a hybrid circuit breaker, the hybrid circuit breaker comprising a hybrid switching device and an electrical switching arrangement arranged in series, the hybrid switching device comprising a mechanical switch and a transistor arrangement arranged in parallel to the mechanical switch, and the electrical switching arrangement comprising: a first conductor path and a second conductor path, wherein the second conductor path is connected in parallel to the first conductor path; a first switch which is arranged in the first conductor path; a second switch which is arranged in the second conductor path; and at least a first semiconductor device arranged in the second conductor path, wherein the first semiconductor device is arranged in series to the second switch, the method comprising:

in normal operation, having the first switch and the second switch in switched-on-positions.

11. The method according to claim 10, the method further comprising, in a switching off proceeding, the first switch is switched-off, and a predefined time after switching-off the first switch, the second switch is switched-off.

* * * * *